United States Patent [19]

Drobish

[11] Patent Number: 5,143,261
[45] Date of Patent: * Sep. 1, 1992

[54] MULTI-COMPARTMENT CONTAINER FOR PROPORTIONAL DISPENSING OF A PLURALITY OF LIQUIDS

[75] Inventor: James L. Drobish, Wyoming, Ohio

[73] Assignee: The Procter & Gamble Company, Cincinnati, Ohio

[*] Notice: The portion of the term of this patent subsequent to Jul. 14, 2009 has been disclaimed.

[21] Appl. No.: 708,071

[22] Filed: May 20, 1991

Related U.S. Application Data

[63] Continuation of Ser. No. 453,562, Dec. 20, 1989, abandoned.

[51] Int. Cl.$^5$ .............................................. G01F 11/26
[52] U.S. Cl. ................................. 222/129; 222/455; 222/424
[58] Field of Search ............... 222/94, 108, 109, 145, 222/207, 424, 426, 431, 442, 424.5, 478, 498, 454–457, 129

[56] References Cited

U.S. PATENT DOCUMENTS

| | | | |
|---|---|---|---|
| 825,680 | 7/1906 | Raymond | 222/129 X |
| 2,205,147 | 6/1940 | Madsen | 225/26 |
| 2,438,906 | 4/1948 | Elsas et al. | 222/129 X |
| 2,661,870 | 12/1953 | Huenergardt | 222/129 |
| 2,661,871 | 12/1953 | Huenergardt | 222/129 |
| 2,664,228 | 12/1953 | Radeloff et al. | 222/455 |
| 2,853,213 | 9/1958 | Buehlig | 222/455 |
| 2,873,887 | 2/1959 | Spero | 222/94 |
| 2,896,826 | 7/1959 | Matter | 222/455 |
| 3,012,695 | 7/1959 | Lerner | 222/129 |
| 3,076,573 | 2/1963 | Thomas | 222/498 X |
| 3,197,071 | 7/1965 | Kuster | 222/145 X |
| 3,200,995 | 8/1965 | Gangwisch | 222/94 |
| 3,220,618 | 11/1965 | Lodding et al. | 222/498 X |
| 3,288,335 | 11/1966 | Steffens et al. | 222/455 |
| 3,347,420 | 10/1967 | Donoghue | 222/129 |
| 3,467,269 | 9/1969 | Newton | 222/94 X |
| 3,506,157 | 4/1970 | Dukess | 222/94 |
| 3,603,485 | 9/1971 | Vivier | 222/129 |
| 3,729,553 | 4/1973 | Gold et al. | 424/44 |
| 3,760,986 | 9/1973 | Castner et al. | 222/145 X |
| 3,851,800 | 12/1974 | Swain | 222/145 |
| 4,061,253 | 12/1977 | Rockefeller | 222/442 |
| 4,065,536 | 12/1977 | Lucas | 264/98 |
| 4,070,140 | 1/1978 | Lucas et al. | 425/533 |
| 4,124,151 | 11/1978 | Hazard | 222/498 |
| 4,125,207 | 11/1978 | Ernst et al. | 222/130 |
| 4,427,041 | 1/1984 | Coetzee | 141/294 |
| 4,449,651 | 5/1974 | Roder et al. | 222/455 |
| 4,585,150 | 4/1986 | Beacham et al. | 222/129 |
| 4,607,762 | 8/1986 | Zulauf et al. | 222/48 |
| 4,614,285 | 9/1986 | Fudalla et al. | 222/454 |
| 4,666,065 | 5/1987 | Ohren | 222/109 |
| 4,678,103 | 7/1987 | Dirksing | 222/130 |
| 4,730,381 | 3/1988 | Dirksing | 29/451 |
| 4,763,816 | 8/1988 | Lee | 222/207 |
| 4,763,817 | 8/1988 | Lee | 222/207 |
| 4,782,985 | 11/1988 | Kinsley | 222/498 X |
| 4,887,747 | 12/1989 | Ostrowskey et al. | 222/498 X |
| 4,893,729 | 1/1990 | Iggulden et al. | 222/145 X |

Primary Examiner—Michael S. Huppert
Assistant Examiner—Kenneth DeRosa
Attorney, Agent, or Firm—Kevin C. Johnson; Michael E. Hilton; Richard C. Witte

[57] ABSTRACT

A container for successively dispensing substantially uniform volumes of a plurality of liquid ingredients such that the liquids are simultaneously dispensed in a desired proportion to form a mixture. The container has a plurality of separate compartments; each compartment being adapted to house a different liquid ingredient. Each compartment has a tubular metering device located therein. The metering device dispenses a previously metered volume and meters a second volume by controlling the venting of air within the compartment each time the container is tilted and uprighted as in a normal dispensing operation. A continuous lip surrounds the dispensing opening of each metering device. The continuous lip prevents a liquid ingredient from entering the dispensing opening of another liquid ingredient compartment and contaminating that compartment. In addition, a flip top cap is attached to the upper end wall. In the closed position the cap seals the dispensing openings of each metering device. The open position of the flip top cap is less than 180° rotation from the closed position and means are provided for preventing the cap from rotating past the open position.

20 Claims, 7 Drawing Sheets

MULTI-COMPARTMENT CONTAINER FOR PROPORTIONAL DISPENSING OF A PLURALITY OF LIQUIDS

This is a continuation of application Ser. No. 07/453,562, filed on Dec. 20, 1989 now abandoned.

FIELD OF THE INVENTION

This invention relates to a multi-compartment container for successively dispensing uniform volumes of liquids such that the liquid from each compartment is dispensed in proper proportion and, more particularly, to such a device where the user is not required to exercise discretion.

BACKGROUND OF THE INVENTION

It is often desirable to keep various liquid components of a product separated until they are to be used. In some cases the two components are incompatible and will not remain mixed, i.e., they separate out. In other cases, the efficacy of the product is dependent upon a reaction which occurs between the liquids. If these component liquids are mixed in a single container by the manufacturer, this beneficial reaction occurs within the container prior to reaching the end user. Consequently, the user receives a liquid of reduced efficacy.

There is difficulty, however, in combining the liquid components at the point of use. Often these liquid components must be combined in accurate proportions which requires that a certain quantity of each liquid component be accurately measured out. Requiring the user to manually measure out each liquid component and them mix them is undesirable. In addition to being messy and time consuming, many households do not have appropriate measuring devices of sufficient accuracy; particularly for measuring small quantities. Consequently, manually measuring risks inaccurate proportioning and failure to obtain optimal functioning of the product.

Donogue U.S. Pat. No. 3,347,420 which issued on Oct. 17, 1967, discloses a multi-compartment container for dispensing several liquids. A dip tube leads from each liquid storage compartment to a corresponding measuring compartment. The user squeezes the walls of each liquid storage compartment causing liquid to flow through the dip tube and into the measuring compartment until the desired amount of liquid is measured out. This procedure, however, requires discretion on the part of the user to decide how much of each liquid to measure out and when to stop squeezing. Therefore, the risk of failure in achieving the proper proportion is not significantly reduced.

Metering devices which do not require discretion on the part of the user have been used to meter a single liquid from a single compartment container. Among these are the devices disclosed by Steffens et al. U.S. Pat. No. 3,788,335 issued on Nov. 29, 1966 and Roder, deceased et al U.S. Pat. No. 4,449,651 on May 22, 1984. Neither suggest they are suitable for multi-component application.

It is, therefore, an object of the invention to provide a multi-compartment dispensing container for simultaneously dispensing successive uniform volumes of a plurality of liquids without requiring discretion on the part of the end user.

It is also an object of the invention to dispense each component liquid in proper proportion relative to the other liquids.

It is likewise an object of the invention to insure the multi-compartment container is tipped correctly enabling proper functioning of the dispensing mechanism.

It is further an object of the invention to accomplish the aforementioned objectives while reducing package and filling costs to a minimum.

Other objects will become apparent hereinafter.

SUMMARY OF THE INVENTION

In accordance with one aspect of the present invention, there is provided a container for successively dispensing substantially uniform volumes of a plurality of liquid ingredients such that the liquids are simultaneously dispensed in a desired proportion to form a mixture. The container includes a plurality of separate compartments, each compartment has a neck and is adapted to house a different one of the liquid ingredients. Each compartment neck has an aperture located at its distal end. Also, included is a plurality of tubular metering devices. Each metering device has a tubular body, and an upper and lower end wall. A dispensing opening is adjacent to periphery of the upper end wall. A metering chamber which is adapted to fill with the desired volume of liquid ingredient each time the metering device is tilted with the dispensing opening lowermost to dispense a previously metered volume and returned to the upright condition. One of the metering devices is telescoped into each compartment aperture and so arranged relative one another that the dispensing openings face in the same pouring direction and the outer surfaces of the upper end walls are generally coplanar. Additionally, a continuous lip surrounds each dispensing opening which is raised above the outer surface of the upper end wall.

BRIEF DESCRIPTION OF THE DRAWINGS

While the specification concludes with claims which particularly point out and distinctly claim the subject matter forming the present invention, it is believed that the invention will be better understood from the following description of the preferred embodiment taken in conjunction with the accompanying drawings in which:

DESCRIPTION OF THE PREFERRED EMBODIMENT

Figure 1:
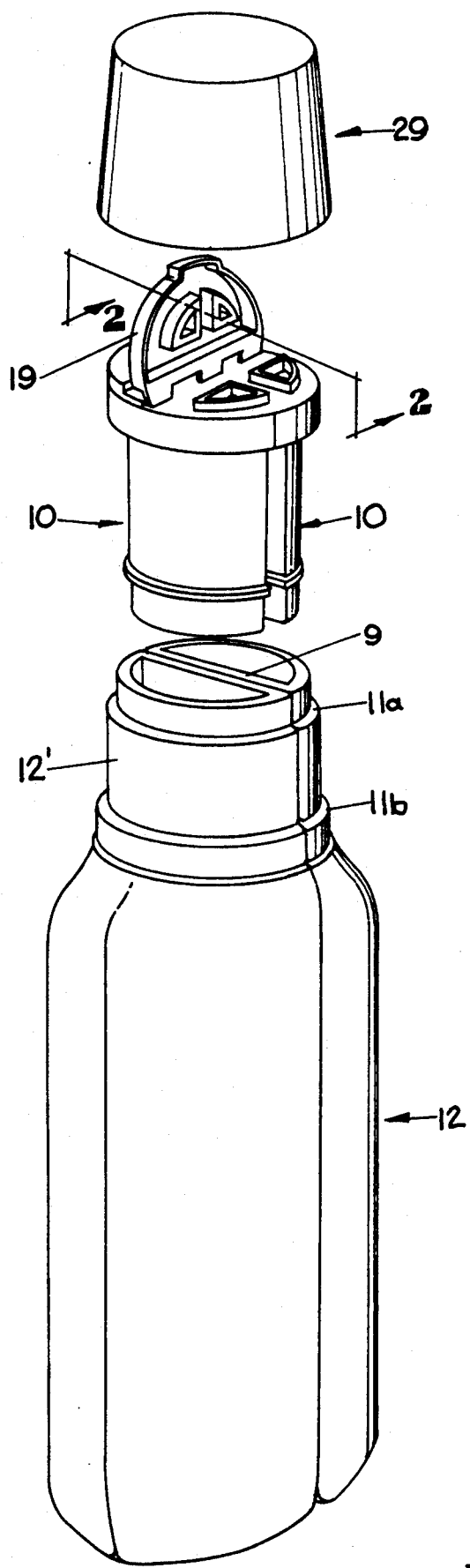
FIG. 1 is an exploded perspective view of the multi-compartment container of the present invention.

Referring to FIG. 1, the present invention provides for a multi-compartment container 12 for uniformly dispensing a plurality of liquid ingredients in a predetermined proportion. A vessel 29 is also provided for receiving the liquid ingredients which will comprise the mixture. The illustrated embodiment dispenses liquids in a 1:1 ratio, however, any ratio can be employed by adjusting the proportions of the container 12 and the quantity metered by each device 10. The neck area of the container has two shoulders 11a and 11b. The free end of the vessel 29 rests on the shoulder 11b of the container 12 when not in use. The neck 12' of each compartment has an aperture therein into which a metering device 10 for dispensing successive uniform quantities of liquid is telescoped. The container 12 can be formed by any suitable means. In one method, each compartment is separately blow molded with a flat side 9 and subsequently attached to another compartment by placing and gluing the flat sides 9 together. In another method, the entire container 12 is blow molded with a dividing wall 9. A method for accomplishing this is taught in Lucas U.S. Pat. No. 4,065,536 issues on Dec. 27, 1977, the disclosure of which is hereby incorporated herein by reference in its entirety.

Figure 2:
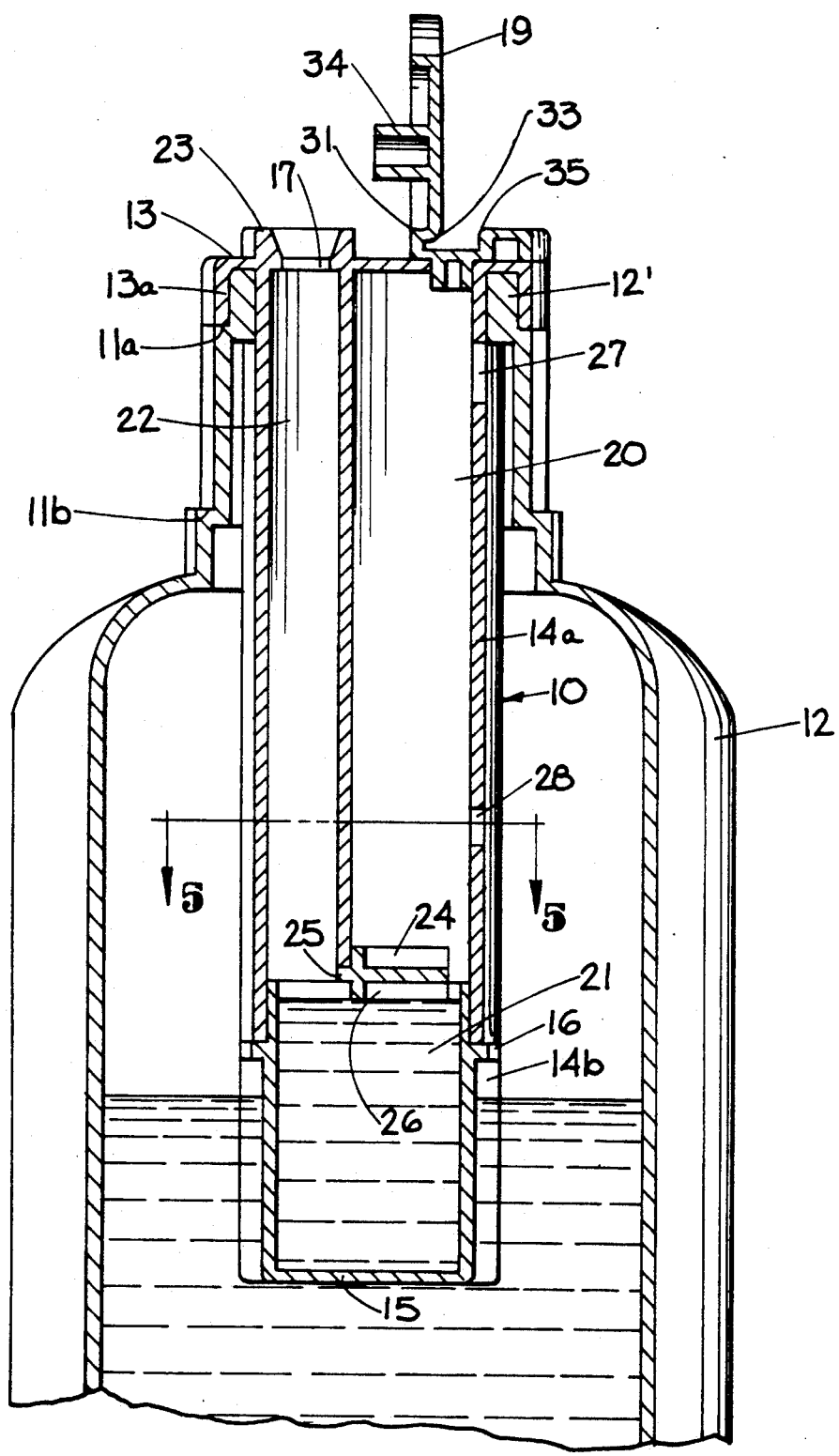
FIG. 2 is a fragmentary vertical section of the container of FIG. 1 taken along the line 2—2 thereof with the container assembled and the cap open.

Referring to FIG. 2, each metering device 10 is a tubular bodied insert of semi-circular cross section for attachment to the neck 12' of each compartment. The exterior of each metering device 10 of the preferred embodiment is substantially the same in shape and dimension as the interior of the corresponding compartment neck 12', creating a liquid proof seal. The tubular body includes a lower end wall 15 and an upper end wall 13. The tubular body of the preferred embodiment is formed of two components, an upper segment and a lower segment which is telescoped into the upper segment. Externally, the lower segment consists of the lower end wall 15, a tubular sidewall 14b and an external flange 16. Externally, the upper segment includes the upper end wall 13 having a dispensing opening 17 therein and a tubular sidewall 14a which has an inlet opening 27 and a vent opening 28 therein. These two segments are glued together to form the tubular body. The two segments are used to facilitate manufacturing. Each segment is preferably injection molded of polypropylene, although other materials such as polyethylene, polyvinyl chloride, polycarbonate and polystyrene, can also be used.

Figure 3:
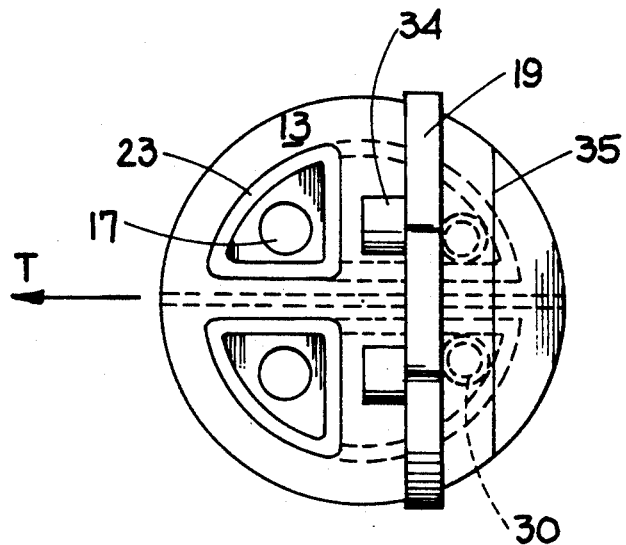
FIG. 3 is a plan view of the metering devices illustrated in FIG. 1 with the cap therefor open.

Referring to FIG. 2 in conjunction with FIG. 3, the upper end wall 13 of the preferred embodiment is integral with, i.e. shared, by both metering devices 10. Thus, the upper end wall 13 interconnects the metering devices 10 to each other and serves to provide their means of attachment to and support from the container 12. The upper end wall 13 has an annular depending portion 13a which is used to glue and sandwich the distal end of the compartment neck 12, between itself and the body of metering device 10. The free end of this annular depending portion 13a rests against the shoulder 11a of the container 12.

A dispensing opening 17 is located in the upper end wall 13 adjacent the periphery thereof for each metering device 10. The dispensing openings 17 are generally coplanar and each dispensing opening 17 is large enough to accommodate two phase flow. Additionally, each dispensing opening 17 is surrounded by a raised, continuous lip 23. The continuous lip 23 is raised above the outer surface of the upper end wall 13 and prevents cross-contamination, i.e., prevents fluids from flowing out the dispensing opening 17 of one metering device 10 and into the dispensing opening 17 of another device 10, contaminating the contents thereof. The inner surface of the raised lip 23 is sloped toward the dispensing opening 17 to aid drainage.

Figure 4:
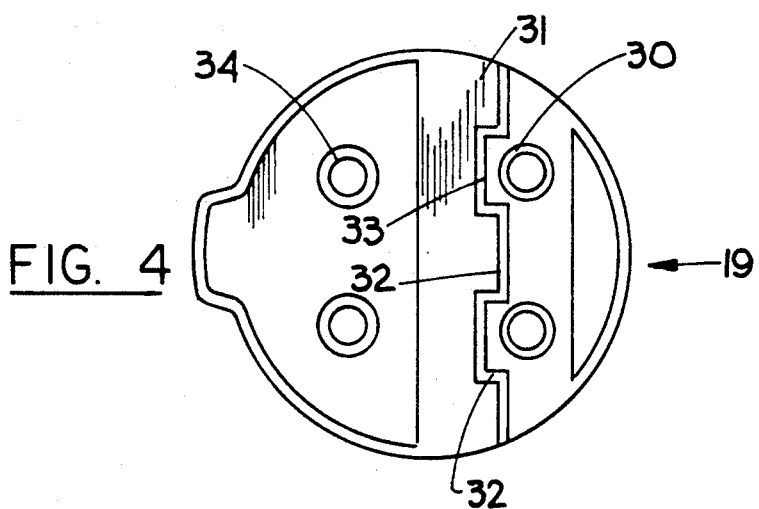
FIG. 4 is a plan view from the bottom of the flip-top cap of the preferred embodiment.

Attached to the upper end wall 13 is a flip-top cap 19. Depending from the flip top cap 19 are four plugs, two sealing plugs 34 and two attaching plugs 30. The upper surface of the flip-top cap 19 has a recessed area which contain the hinge mechanism which attaches the stationary portion of the flip-top cap 19 to the rotating portion. Referring to FIG. 4, the hinge mechanism consists of three cut out areas 32, three tabs 31 and two thinned hinge sections 33. Returning to FIG. 2, the flip-top cap 19 is attached to the upper end wall 13 by means of heat staking. Heat staking involves attaching the cap 19 by pressing the attaching plugs 30 through attaching openings, in the upper end wall 13 and enlarging the attaching plugs 30 with a heated conically-shaped rod. Other methods of attaching the flip-top cap 19 include snap fitting the attaching plugs 30 through the attaching openings or simply gluing the cap 19 in place.

The flip-top cap 19, in the closed position, seals the dispensing opening 17 of each metering device 10 with a sealing plug 34 inserted into each dispensing opening 17. The flip-top cap 19 has means for preventing the cap 19 from rotating greater than 180° into the open position. In other words, the flip-top cap 19 has a means which prevents it from being rotated from the closed position into an open position which is greater than 180° rotation from the sealed position. This means is provided in the preferred embodiment by the edge 35 of the stationary portion of the flip-top cap 19 contacts the rotating portion of the flip-top cap 19 limiting its rotation to about 135°. Once the cap 19 is opened, the tabs 31 (seen in FIG. 4) contact the upper end wall 13 thereby hindering rotation of the cap 19 to the closed position. Thus, the cap 19 is held open and out of the way during dispensing by the tabs 31.

As best seen in FIG. 2, a vertical wall 18 which is offset from center divides the cross section of the upper portion of each metering device 10 into a large metering chamber 20 and a relatively small dispensing passage 22. Offsetting the vertical wall 18 toward the dispensing passage 22 side increases the proportion of the cross-sectional area of the metering device 10 devoted to the metering chamber 20. Consequently, the length of the metering chamber 20 necessary to meter a given volume is minimized. Additionally, since the proportion of space utilized for the metering chamber 20 is increased, the overall volume of the metering device 10 is also minimized. Alternatively, for ease of manufacturing the dividing wall 18 may be centrally located such that it divides the cross-section of the metering device 10 into two channels with equivalent cross-sectional area.

As FIG. 2 illustrates, the vertical wall 18 terminates above the lower portion of each metering device 10, which portion is, therefore, not interiorly partitioned. Thus, a collecting chamber 21 is formed in the lower, undivided, portion of the metering device 10. This collecting chamber 21 communicates with the metering chamber 20 and the dispensing passage 22 at the right and left sides of its upper end respectively. The metering chamber 20 is partially segregated from the collecting chamber 21 by a transverse baffle 25 projecting horizontally from the lower end of the vertical wall 18 intermediate the metering 20 and collecting 21 chambers.

Figure 5:
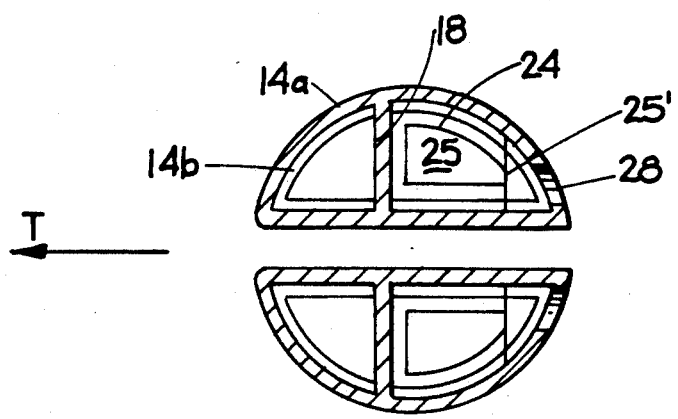
FIG. 5 is a cross section of the metering devices taken along the line 5—5 of FIG. 2.

The baffle 25 is sandwiched between an upper ledge 24 molded as part of the interior of the upper segment side wall 14a and a lower ledge 26 which is molded as part of the lower segment side wall 14b. The baffle 25 is frictionally held between the upper and lower ledges 24 and 26. The baffle 25 is sized so that the liquid product will not flow from the metering chamber 20 into the collecting chamber 21 when the metering device 10 is moved to any angle "A" from 0° to 90° during a normal pouring cycle. In other words, the baffle 25 blocks off the lower end of the metering chamber 20 except for the portion thereof farthest removed from the dispensing passage 22. This serves to prevent flow of liquid in either direction between the metering 20 and the collecting 21 chambers during the normal course of pouring a previously measured volume from the container 12. Due to the baffle 25 communication between the metering chamber 20 and the collecting chamber 21 therealong is reduced and the geometric center of the cross-sectional area of the remaining passage therebetween is closer to the backside of the metering device 10 with the baffle 25 than without the baffle 25. The baffle 25 of the preferred embodiment is doubly planar and protrudes perpendicularly from the vertical dividing wall 18. In this embodiment, the baffle 25, as seen in FIG. 5, extends from the vertical wall 18 to an edge 25' which is parallel to the vertical wall 18. This edge 25' is also perpendicular to the direction of tipping shown in FIGS. 3 and 5 as the arrow "T".

Referring to FIG. 2, each metering device 10 has a vent opening 28 and a separate inlet opening 27. Each opening, 28 and 27, is located in the tubular outer body and provides access directly to the metering chamber 20 from the interior of each compartment. Preferably openings 27 and 28 are axially aligned and lie on the back side of the metering device 10, i.e., away from the direction of tipping. In an alternative embodiment (not shown) the vent opening 28 may perform the functions of both openings 27 and 28. These openings 27 and 28 and the alternative embodiment will be discussed in detail hereinafter.

Referring to FIG. 2 and FIG. 3, in order for these metering devices 10 to operate properly they should be oriented with their dispensing openings 17 facing in the same pouring direction. In other words, the metering devices 10 should be identically oriented. This is necessary because the most accurate operation of these metering devices 10, requires the container 12 to be tilted in the direction of the dispensing passage 22 as shown by the arrow T in FIG. 3 and FIG. 5. To discourage the user from tipping the container 12 in a direction other than the direction of the dispensing openings 17, the flip-top cap 19 which will not rotate a full 180° is used to seal the container 12. Consequently, the end user is encouraged to tip the container 12 towards the dispensing openings 17 which ensures proper operation of the metering device 10. In addition to orienting the end user's direction of pour, the flip-top cap 19 seals the multiple dispensing openings 17 with sealing plugs 34 when the flip-top cap 19 is in the closed position. The flip-top cap 19 seals the multiple dispensing openings 17 better than a screw cap and avoids cross-contamination of the liquids when capping the dispensing openings 17.

Figure 6:
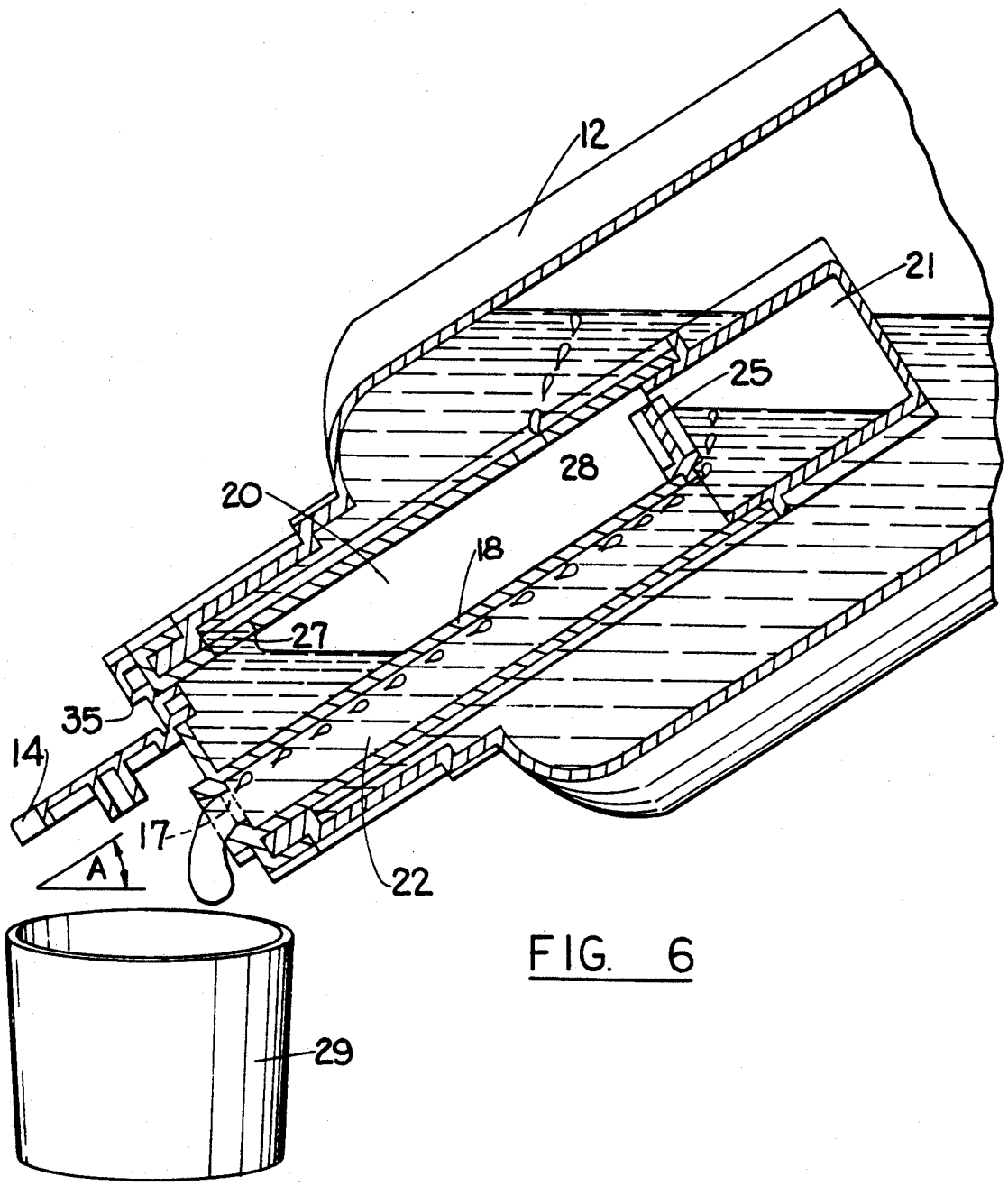
FIG. 6 is a fragmentary vertical section similar to that of FIG. 2 illustrating the simultaneous flow of liquid into the metering chamber and out of the collecting chamber during dispensing.

For simplicity, discussion of the operation of the metering devices 10 will be limited to one metering device 10 unless otherwise indicated. A metering device 10 is telescoped into the neck 12' of each compartment. Each device 10 operates similarly and simultaneously although the vent opening 28 can be relocated to adjust proportioning. The operation of the metering device 10, begins with the metering device 10 as shown in FIG. 2. The container 12 is in its upright position and a pre-metered liquid product volume is resting in the collecting chamber 21. The user, encouraged by the flip-top cap 19, tips the container 12 in the direction of the dispensing opening 17. This direction is indicated in FIGS. 3 and 5, by the arrow "T". Referring to FIG. 6, as the container 12 is tipped, the uniform liquid product volume from the collecting chamber 21 flows through the dispensing passage 22 and out the dispensing opening 17 and mixes in the vessel 29.

Figure 7:
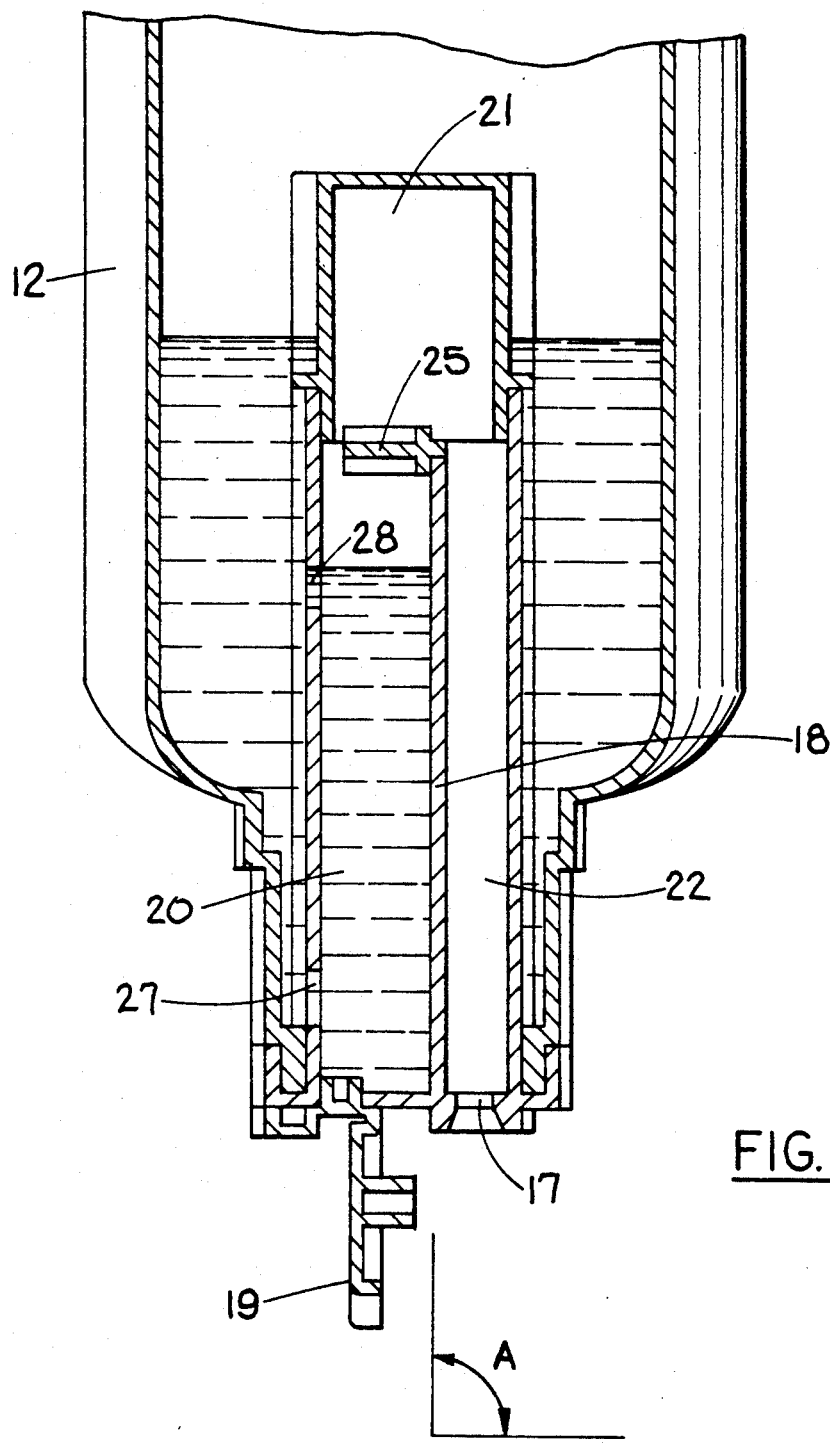
FIG. 7 is a fragmentary vertical section similar to that of FIG. 2 with the devices in a fully inverted position.

Simultaneously, liquid from the compartment flows through the inlet opening 27 and into the metering chamber 20 while air enters the compartment through the vent opening 28, replacing the exiting liquid. Ideally, the container 12 is tipped until it is, as seen in FIG. 7, completely inverted, (or at least to the same angle "A" relative to the horizontal each time). The flow of air and liquid into and out of the metering chamber 20 continues until the liquid level within the metering chamber 20 rises to cover the vent opening 28. At this point, the compartment is airlocked, i.e., air can no longer enter the compartment. The vent opening 28 is located so the compartment air locks when a uniform metered volume is contained in the metering chamber 20. As will be discussed below, the device 10 is assured of airlocking because of the baffle 25.

Even after the compartment is airlocked, however, an excess quantity of liquid flows into the metering chamber 20. The amount of the excess quantity is dependent upon the specific weight of the liquid, the height of the liquid column within the compartment, and the quantity of air within the compartment subjected to subatmospheric pressure. As the container 12 is returned to its upright position, however, this excess quantity of liquid within the metering chamber 20 over the uniform metered volume, is drawn back into the compartment from the metering chamber 20 as the air within the compartment returns to atmospheric pressure. The uniform metered volume remains in the metering chamber 20 to flow into the collecting chamber 21.

Figure 9:
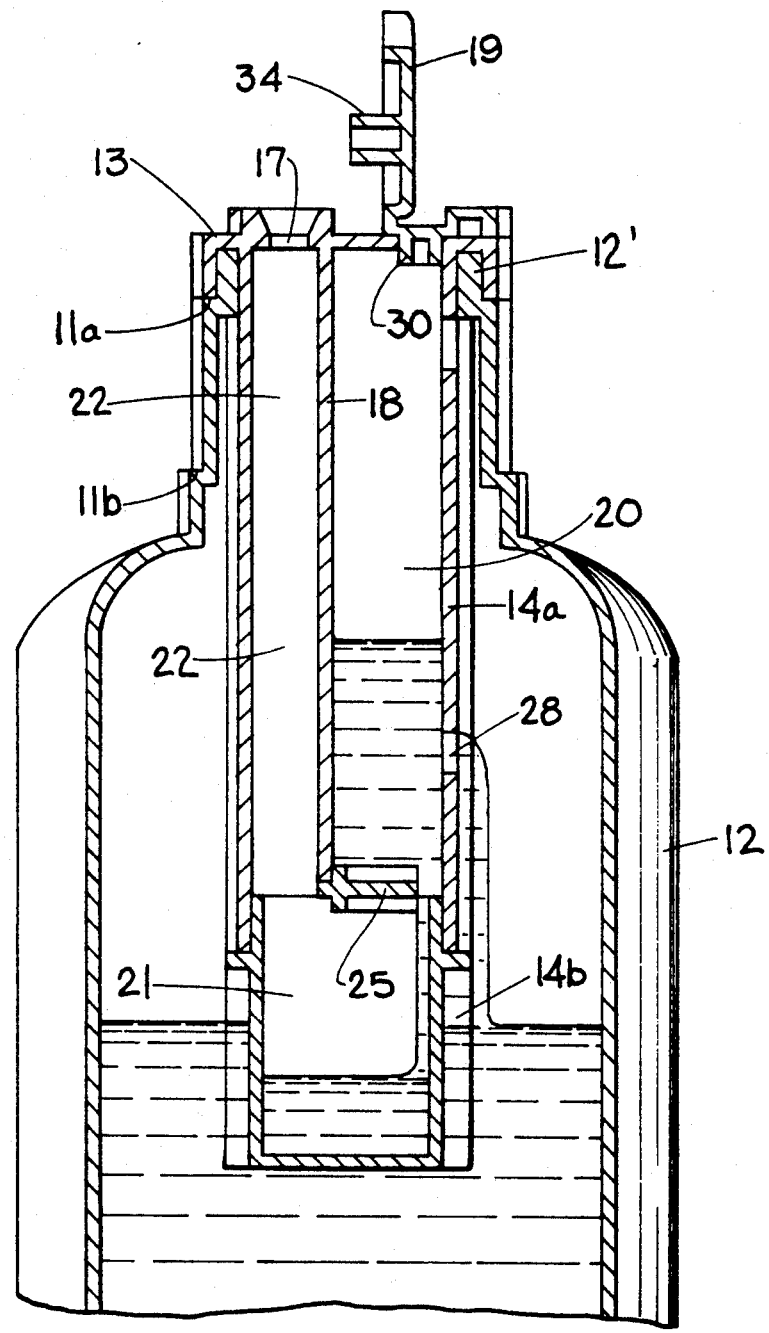
FIG. 9 is a fragmentary vertical section similar to that of FIG. 2 illustrating the flow of liquid from the metering chamber into the collecting chamber.

As the container 12 is uprighted, however, not all of the uniformed metered volume flows from the metering chamber 20 into the collecting chamber 21. As seen in FIG. 9, some of the liquid is lost through the inlet opening 27, the vent opening 28, or both as it flows back into the compartment. The remaining liquid which flows into the collecting chamber 21 is the uniform product volume. Thus, the container 12 is returned to its original, FIG. 2, status.

The baffle 25 makes possible the relationship illustrated by the following equation:

$$UPV = UMV - ULV$$

where UPV (uniform liquid product volume) is the amount of liquid product dispensed; UMV (uniform metered volume) is the amount of liquid measured in the metering chamber 20; and ULV (uniform lost volume) is the amount of liquid which is lost through the inlet opening 27, the vent opening 28, or both, as the container 12 is uprighted (excluding the excess quantity over the uniform metered volume). The baffle 25 makes all of these quantities, i.e., UPV, UMV and ULV, virtual constants with only minimal deviations when the metering device 10 is operated normally. The baffle 25 accomplishes this by either eliminating or normalizing various losses and problems which can occur during a cycle of operation, thereby making the above equation possible. The baffle 25 eliminates the continuous flow problem and virtually eliminates the problem of liquid flowing back into the metering chamber 20 from the collecting chamber 21. The baffle 25 also normalizes the metered volume and the lost volume. Each of these problems and how the baffle 25 eliminates them will be discussed below, in turn.

Figure 8:
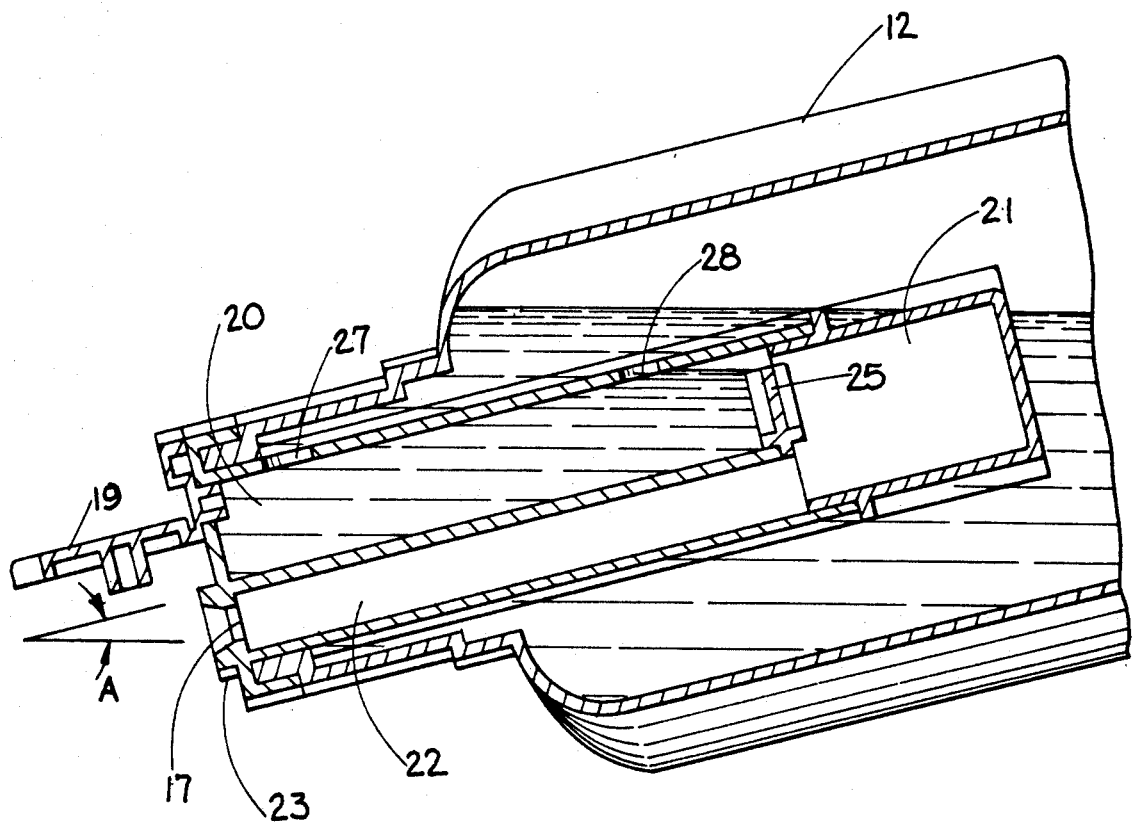
FIG. 8 is a fragmentary vertical section similar to that of FIG. 2 illustrating the device following completion of a dispensing operation.

The baffle 25, eliminates the continuous flow problem. Liquid will not continuously flow through the metering device 10 when the axis of the metering device 10 is held at relatively small angles "A" in relation to the horizontal. Without the baffle 25, liquid can flow out of the metering chamber 20, around the end of the vertical wall 18 and out of the metering device 10 when "A" is a relatively small angle. Referring to FIG. 8, without the baffle 25 liquid would continuously flow around the end of the vertical wall 18 if the device is held at the angle "A" shown, without airlocking the compartment. With the baffle 25, as shown, the liquid level must rise above the baffle 25 before it can flow out of the metering chamber 20. Logically, it would seem there should be some angle "A" at which continuous flow will occur over the baffle 25. Continuous flow, however, does not occur in the metering device 10 with the baffle 25, at any angle. Thus, with the baffle 25 liquid product will not flow from the metering chamber 20 into the collecting chamber 21 when the metering device is held at any angle "A" from 0° to 90°. Although the reasons for this phenomenon are not completely understood, it is believed that the surface tension effects are such that the liquid will not pass when the metering device 10 is tipped for dispensing. It has been found that for a typical mouthwash in a metering device 10 of 31.5 mm diameter, it is preferable that the maximum distance between the free edge 25' of the baffle 25 and the tubular outer body be less than about 5 mm.

The baffle 25 also virtually eliminates the problem of liquid from the collecting chamber 21 flowing back into the metering chamber 20 rather than out the dispensing passage 22. Without the baffle 25, as the container 12 is tilted, some of the liquid from the collecting chamber 21 could easily flow back into the metering chamber 20 instead of out the dispensing passage 22. Consequently, a full uniform product volume would not be dispensed. The quantity of liquid which would be lost in this manner would vary greatly depending upon how quickly the container 12 is tilted and whether the container 12 is tilted in a direction other than that shown on FIGS. 3 and 4 as "T". The baffle 25 serves as a barrier against this type of loss. Under normal operation, therefore, the baffle 25 virtually eliminates any deviation due to liquid back flowing from the collecting chamber 21 into the metering chamber 20.

Additionally, the baffle 25 normalizes the quantity of liquid actually metered, i.e., the metered volume. There is a certain amount of deviation in the angle "A" at which different individuals will terminate tilting of the container 12 when they are dispensing product from the container 12. Since the deviation in the angle "A" results in a deviation in the angle of the surface of the liquid within the metering chamber 20 as the metering chamber 20 fills, a slightly different quantity of liquid will be metered depending upon the angle used. This can be seen by comparing the quantity of liquid in the metering chamber 20 in FIG. 7 with that in FIG. 8.

Referring to FIG. 8, without a baffle 25 the vertical wall 18 would need to be extended to prevent continuous flow at the angle "A" shown. Thus, without the baffle 25, this variable volume has a rather large triangular vertical sectional area defined by corners at the vent opening 28, the tip of the extended vertical wall, and a point on the vertical wall 18 diametrically opposite the vent opening 28. When a baffle 25 is used, such vertical-section area is reduced because the tip of the triangle along the extended vertical wall is cut off leaving a smaller volume with a trapezoidal cross-sectional area for deviation. Thus, the possible deviation which can occur in the metering operation is reduced.

This deviation can be further reduced because it has been found that the angle "A" at which people terminate tilting of the container 12 is largely dependent upon the size of the vessel the liquid is being dispensed into. If a small vessel is being dispensed into a relatively small container a small angle is generally used while a larger vessel encourages a larger angle. The average angle people use for a particular application can be determined and taken into account when locating the vent opening 28 which further reduces the inaccuracy of the metered volume. This tendency has been taken advantage of in the preferred embodiment by providing a vessel 29 (as seen in FIG. 2) into which the liquid is dispensed.

The baffle 25, having dealt with the above discussed problems, creates a situation where the only volume lost flows from the metering chamber 20 through the inlet opening 27 or the vent opening 28, or both, as the container 12 is returned to its upright position. In addition, the baffle 25 normalizes the quantity of the uniform lost volume, such that it is a virtual constant with only minor deviations. The uniform lost volume is equal to the rate of flow through the vent opening 28 multiplied by the time liquid flows through the vent opening 28 plus the rate of flow through the inlet opening 27 multiplied by the time liquid flows through the inlet opening 27. Although the uniform lost volume can occur through the inlet opening 27, the vent opening 28 or both, the bulk of the uniform lost volume, as seen in FIG. 9, flows through the vent opening 28. Thus, uniform lost volume generally equals the rate of flow through the vent opening 28 multiplied by the time liquid flows through the vent opening 28. The rate of flow is dependent upon the size of the vent opening 28 and is, therefore, constant.

Without the baffle 25, variation occurs because the amount of time liquid flows through the vent opening 28 is dependent upon the speed at which the container 12 is uprighted. If the container 12 is uprighted quickly, the amount of time liquid contacts the tubular wall 14a near the vent opening 28 is increased, and thus, the quantity of the lost volume is increased. A reduction in the rate of uprighting the container 12 will result in a corresponding reduction in amount of time and a corresponding reduction in the lost volume.

With the baffle 25, the amount of time liquid covers the vent opening 28 is normalized. The baffle 25 constricts the flow of liquid from the metering chamber 20 into the collecting chamber 21 as the container 12 is uprighted. Therefore, as seen in FIG. 9, a backup of liquid occurs as the liquid in the metering chamber 20 must wait to pass into the collecting chamber 20. This backup of liquid above the baffle 25 can be thought of as a column of liquid in the metering chamber 20. The column continuously grows shorter as the liquid flows from the metering chamber 20 into the collecting chamber 21. The location of the vent opening 28 in relation to the baffle 25 and the rate at which liquid flows around the baffle 25 determines the amount of time the column heighth is above the vent opening 28. This amount of time is virtually constant regardless of whether the container 12 is uprighted relatively quickly or relatively slowly in normal operation.

It should be apparent from the foregoing that the baffle 25 eliminates many problems in the metering device 10 enabling accurate metering from use to use. It is also important in many instances to maintain the overall volume of the metering device 10 as small as possible. The smaller the quantity of lost volume, the smaller the overall volume of the metering device 10 since the length of the metering chamber 20 can be reduced. The quantity of the lost volume is controlled by the size of the vent opening 28 and its location relative to the baffle 25, the size of the inlet opening 27 and its location in relation to the baffle 25, and the rate of flow from the metering chamber 20 to the collecting chamber 21. The greater the losses, the greater the volume of liquid which must be metered and the greater the overall volume of the metering device 10. The inlet opening 27 is preferably located on the back side of the metering device 10. Location on the back side reduces the quantity of the lost volume because as the container 12 is uprighted, gravity maintains the metered volume of liquid away from the back side and, consequently away from the inlet opening 27.

Locating the inlet opening 27 on the side of the tubular body away from the direction of tilting, i.e., the back side, virtually eliminates most of the lost volume through this opening 27. The inlet opening 27 is also preferably large enough that it permits the metering operation to complete, i.e. airlock occurs, before all the liquid can be dispensed from the collecting chamber 21. Otherwise, a full uniform metered volume may not have time to enter the metering chamber 20 before the container 12 is uprighted. Thus, a main function of the inlet opening 27 is to speed the flow of liquid into the metering chamber 20. The inlet opening 27, however, should be only large enough to allow airlock to occur before all the liquid can be dispensed from the collecting chamber 21 through the dispensing passage 22. This is necessary because the larger the inlet opening 27 the larger the quantity of liquid which will be lost through the inlet opening 27. Simultaneously, the smaller the inlet opening 27 the smaller the quantity of liquid lost through the inlet opening 27.

Also, to reduce the quantity of liquid lost through the inlet opening 27, the inlet opening 27 should be located as close to the upper end wall 13 as possible. This location reduces the quantity of liquid which must flow past the inlet opening 27 on its way to the collecting chamber 21 thereby reducing the lost volume through the inlet opening 27. In many instances, however, as illustrated in the preferred embodiment, the inlet opening 27 will be located a distance away from the upper end wall 13. In either instance, the inlet opening 27 should be located at the uppermost point within the compartment to which fluid can flow. This allows complete emptying of the compartment. Also, the inlet opening 27 should be located a distance from the upper end wall 13 less than or equal to the distance from the vent opening 28 to the baffle 25. This reduces the amount of lost volume through the inlet opening 27 by drastically reducing the amount of time the liquid is above the inlet opening 27 as the container 12 is uprighted.

The vent opening 28, like the inlet opening 27, should be located on the back side of the metering device 10. Also, like the inlet opening 27, the vent opening 28 is preferably small to reduce the quantity of lost volume through the vent opening 28 but large enough to permit completion of the filling operation before all the liquid can be dispensed from the collecting chamber 21 through the dispensing passage 22. The greater the distance of the vent opening 28 from the baffle 25, the less the lost volume. This is because the amount of time the liquid column height is above the vent opening 28 is reduced. Likewise, however, the closer the vent opening 28 to the baffle 25, the lesser the overall volume of the metering device 10.

The inlet 27 and vent 28 openings are also affected by their interrelationship. In one sense it is desirable to decrease the distance between the openings 27 and 28 because as the compartment 12 empties, the last several doses to be dispensed will not be complete. To some extent, this can be corrected by adjusting the shape of the compartment such that there is only a small volume within the compartment between the two openings 27 and 28. In other words it is preferable to reduce the volume of the compartment between two imaginary horizontal planes through the inlet opening 27 and the vent opening 28 respectively. This is preferred because if this volume is large then there will be a gradual reduction in the quantity of liquid dispensed. This reduction occurs because, when the quantity of liquid within the compartment is less than this volume, the metering chamber 20 will be unable to fill completely. The greater the volume, the greater the number of times a complete uniform metered volume is not metered. To decrease the distance between the openings 27 and 28, however, since the location of the vent opening 28 is fixed by the metered volume, requires one to increase the distance from the upper wall 13 to the inlet opening 27 which, as has been discussed above, requires a trade-off between overall volume of the metering device 10 and the quantity of the lost volume through the inlet opening 27.

The baffle 25 should be large enough to prevent the problems of continuous flow and to reduce the amount of liquid flowing back into the metering chamber 20 from the collecting chamber 21. Likewise, the baffle 25 must be small enough that there is a sufficient passage to permit fairly rapid flow of liquid from the metering chamber 20 into the collecting chamber 21 to reduce the amount of time the liquid level is above the inlet 27 and vent 28 openings and consequently, the amount of lost volume.

Having taken the aforementioned into consideration, the metering devices 10 of one preferred embodiment wherein the metering chamber 20 and dispensing passage 22 have the same cross-sectional area has the following approximate dimensions. Each metering device 10 has an overall length of 11.0 cm and a generally semi-circular shape with a total cross-sectional area of 1.50 cm$^2$ in the upper segment 14a. The dividing wall 18 which separates the upper portion of the metering device 10 into the metering chamber 20 and the dispensing passage 22 extends 7.6 cm from the top wall 13. The resulting metering chamber 20 has a cross-sectional area of 0.75 cm$^2$ and the resulting cross-sectional area of the dispensing passage 22 is also 0.75 cm$^2$. The distance from the vertical wall 18 to the free edge 25, of the baffle 25 is 0.77 cm leaving a cross-sectional area of 0.33 cm$^2$ through which the liquid flows to enter the collecting chamber 21. The inlet opening 27 has a 0.62 cm diameter and is located 1.3 cm from the top wall 13. The vent opening 28 has a 0.49 cm diameter and is located 6.1 cm from the top wall 13. Each of these metering devices 10 are used to meter 5 ml of a liquid having a viscosity of 1.0 cps.

It is possible to eliminate the inlet opening 27 in an alternative embodiment (not shown) by simply enlarging the vent opening 28. In this alternative embodiment the vent opening 28 must be large enough to serve both the inlet 27 and vent 28 opening functions. Consequently, the vent opening 28 must be capable of sustaining two phase flow. In other words, the vent opening 28 must be large enough to permit air to enter the compartment and liquid to enter the metering chamber 20 relatively quickly. This alternative embodiment may be undesirable because enlarging the vent opening 28, which the metered liquid must flow past as the container 12 is uprighted, can result in an inordinate amount of lost volume. In certain situations, however, if the size of the vent opening 28 is such that alternating flow, occurs, i.e., liquid in and then air out, the lost volume is actually reduced. The lost volume is reduced because, although the vent opening 28 is larger, the amount of time liquid is flowing through the vent opening 28 is reduced because of the alternating condition. Although this is a benefit as far as losses are concerned, it is a detriment with respect to filling the metering chamber 20 with a full uniform metered volume before the uniform product volume is dispensed through the dispensing passage 22.

The function of this device 10 as normally operated then, is as follows. The flip-top cap 19 is removed from its closed position where the sealing plug 34 seals the dispensing opening 17 of each device. As seen in FIG. 2, the container 12 is in its upright position and a pre-metered uniform product volume is resting in the collecting chamber 21. The user tips the container 12, as shown in FIG. 6, in the direction of the dispensing passage 22. This direction of tipping is encouraged because a flip-top cap 19 will not rotate away enabling dispensing in another direction. Dispensing in this direction also ensures there is no cross-contamination. As the container 12 is tipped, the liquid from the collecting chamber 21 flows through the dispensing passage 22. The baffle 25 virtually prevents any of this liquid from flowing from the collecting chamber 21 back into the metering chamber 20. The liquid exits the dispensing passage 22 through the dispensing opening 17. The liquid of the preferred embodiment is poured into the vessel 29 where it mixes with the liquid dispensed from the other metering device 10 of the container. Thus, the desired mixture is formed in the vessel 29.

Simultaneously, liquid from the compartment flows through the inlet opening 27 and into the metering chamber 20 while air enters the compartment through the vent opening 28. This flow continues until the liquid level within the metering chamber 20 rises to cover the vent opening 28 (as seen in FIG. 7). At this point the compartment 12 is airlocked because air can no longer enter the compartment. The vent opening 28 is located so that compartment airlocks when the uniformed metered volume is contained in the metering chamber 20. The device is ensured of airlocking because the baffle 25 makes continuous flow impossible.

Even after the compartment is airlocked, however, an excess quantity of liquid flows into the metering chamber 20. As the container 12 is returned to its upright position, this excess quantity of liquid within the metering chamber 20 over the uniform metered volume, is drawn back into the compartment from the metering chamber 20 as the air within the compartment returns to atmospheric pressure. In addition, as seen in FIG. 9, the baffle 25 slows the flow of liquid from the metering chamber 20 into the collecting chamber 21. This results in a column of liquid rising above the baffle 25 which allows liquid to pass into the container 12 through the vent opening 28. This quantity of liquid is the lost volume and is constant from one operation to another due to the baffle 25 in normal operation. The remainder of the liquid in the metering chamber 20 flows into the collecting chamber 21 returning the container 12 to its original, FIG. 2, status. Also, as the container 12 is uprighted there is no cross-contamination between the liquids because each dispensing opening 17 is surrounded by continuous raised lips.

It is of course to be understood that the present invention is by no means limited to the particular arrangement shown in the drawings but also comprises any modifications within the scope of the appended claims.

What I claim is:

1. A container for successively dispensing substantially uniform volumes of a plurality of liquid ingredients such that the liquids are simultaneously dispensed in a desired proportion relative to each other to form a predetermined quantity of a mixture, said container comprising:

(a) a plurality of separate compartments, each compartment having a neck and being adapted to house a multiplicity of volumes of a different one of said liquid ingredients, each neck having an aperture located at its distal end;

(b) a plurality of tubular metering devices, (i) each said metering device having a tubular body, said tubular body having an upper and lower end wall, said upper end wall having a dispensing opening located therein, said tubular body also having a vent opening located therein providing communication between the interior of said metering device and the interior of said container, an axially extending vertical wall dividing the upper portion of the interior of said metering device into a metering chamber sealed at the top by said upper end wall and a dispensing passage which communicates with the exterior of said device through said dispensing opening, said vertical wall terminating above said lower end wall of said metering device, leaving an undivided collecting chamber in the bottom portion of the interior of said metering device, said collecting chamber being in communication at its upper end with both said metering chamber and said dispensing passage; a transverse baffle projecting from said vertical wall intermediate said metering chamber and said collecting chamber, said baffle blocking off the lower end of said metering chamber, except for the portion thereof furthest removed from the dispensing passage, and serving to prevent flow of said liquid in either direction between the metering and the collecting chambers during the normal course of pouring a previously measured volume from the container; and (ii) one of said metering devices being telescoped into each said aperture, said metering devices being so-arranged relative one another that the dispensing openings face in the same pouring direction and the outer surfaces of the upper end walls are generally coplanar, each said metering device being adapted to successively dispense substantially uniform volumes of one said liquid ingredient such that said liquid ingredient is dispensed in a desired proportion relative to the other said liquid ingredients to form a predetermined quantity of said mixture.

2. A container according to claim 1 wherein said tubular body of each said metering device having a semicircular cross section.

3. A container according to claim 2 wherein said upper end wall of each said metering device is shared by all said metering devices.

4. A container according to claim 3 further comprising a flip-top cap attached to the upper end wall, said cap having a closed position which seals the dispensing apertures of each said metering device, an open position which is less than 180° rotation from said closed position and means for preventing said cap from rotating past the open position.

5. A container according to claim 4 wherein said vent opening is located as far as possible away from said dispensing passage on the back side of said metering device and thereby being located away from the direction of tilting.

6. A container according to claim 5 wherein each said metering device further comprises an inlet opening located axially above said vent opening in said tubular body providing communication between the interior of said metering device and the interior of said compartment.

7. A container according to claim 3 wherein said vent opening is located as far as possible away from said dispensing passage on the back side of said metering device and thereby being located away from the direction of tilting.

8. A container according to claim 7 wherein each said metering device further comprises an inlet opening located axially above said vent opening in said tubular body providing communication between the interior of said metering device and the interior of said compartment.

9. A container according to claim 2 further comprising a flip-top cap attached to the upper end wall, said cap having a closed position which seals the dispensing openings of each said metering device, an open position which is less than 180° rotation from said closed position and means for preventing said cap from rotating past the open position.

10. A container according to claim 1 wherein said vent opening is located as far as possible away from said dispensing passage on the back side of said metering device and thereby being located away from the direction of tilting.

11. A container according to claim 10 wherein each said metering device further comprises an inlet opening located axially above said vent opening in said tubular body providing communication between the interior of said metering device and the interior of said compartment.

12. A container according to claim 1 wherein said upper end wall of each said metering device is shared by all said metering devices.

13. A container according to claim 12 further comprising a flip-top cap attached to the upper end wall, said cap having a closed position which seals the dispensing openings of each said entering device, an open position which is less than 180° rotation from said closed position and means for preventing said cap from rotating past the open position.

14. A container according to claim 1 further comprising a flip-top cap attached to said upper end wall, said cap having a closed position which seals the dispensing openings of each said metering device, an open position which is less than 180° rotation from said closed position and means for preventing said cap from rotating past the open position.

15. A container for successively dispensing substantially uniform volumes of a plurality of liquid ingredients such that the liquids are simultaneously dispensed in a desired proportion relative to each other to form a predetermined quantity of a mixture, said container comprising:

(a) a plurality of separate compartments, each compartment having a neck and being adapted to house a multiplicity of volumes of a different one of said liquid ingredients, each neck having an aperture located at its distal end;

(b) a plurality of tubular metering devices,
(i) each said metering device having a tubular body, said tubular body having an upper and a lower end wall, said upper end wall having a dispensing opening located therein, said tubular body also having a vent opening located therein providing communication between the interior of said metering device and the interior of said container, an axially extending vertical wall dividing the upper portion of the interior of said metering device into a metering chamber sealed at the top by said upper end wall and a dispensing passage which communicates with the exterior of said device through said dispensing opening, said vertical wall terminating above said lower end wall of said metering device, leaving an undivided collecting chamber in the bottom portion of the interior of said metering device, said collecting chamber being in communication at its upper end with both said metering chamber and said dispensing passage; a transverse baffle projecting from said vertical wall intermediate said metering chamber and said collecting chamber, said baffle blocking off the lower end of said metering chamber, except for the portion thereof furthest removed from the dispensing passage, and serving to prevent flow of said liquid in either direction between the metering and the collecting chambers during the normal course of pouring a previously measured volume from the container;

(ii) one of said metering devices being telescoped into each said aperture, said metering devices being so-arranged relative one another that the dispensing openings face int he same pouring direction and the outer surfaces of the upper end walls are generally coplanar, each said metering device being adapted to successively dispense substantially uniform volumes of one said liquid ingredient such that said liquid ingredient is dispensed in a desired proportion relative to the other said liquid ingredients to form a predetermined quantity of said mixture; and (c) a continuous lip completely surrounding each said dispensing opening which is raised above the outer surface of said upper end walls.

16. A container according to claim 15 wherein said tubular body of each said metering device has a semicircular cross-section.

17. A container according to claim 16 further comprising a flip-top cap attached to said upper end wall, said cap having a closed position which seals the dispensing openings of each said metering device, an open position which is less than 180° rotation from said closed position and means for preventing said cap from rotating past the open position.

18. A container according to claim 15 wherein said upper end wall of each said metering device is shared by all said metering devices.

19. A container according to claim 15 further comprising a flip-top cap attached to said upper end wall, said cap having a closed position which seals the dispensing openings of each said metering device, an open position which is less than 180° rotation from said closed position and means for preventing said cap from rotating past the open position.

20. A container according to claim 15 wherein said vent opening is located as far as possible away from said dispensing passage on the back side of said metering device and thereby being located away from the direction of tilting.

* * * * *